July 29, 1958
G. J. BADGLEY
2,844,991
LIGHT TRAP
Filed May 14, 1954
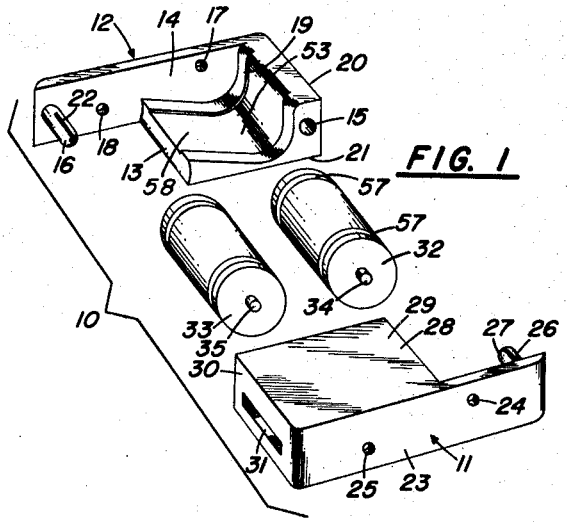
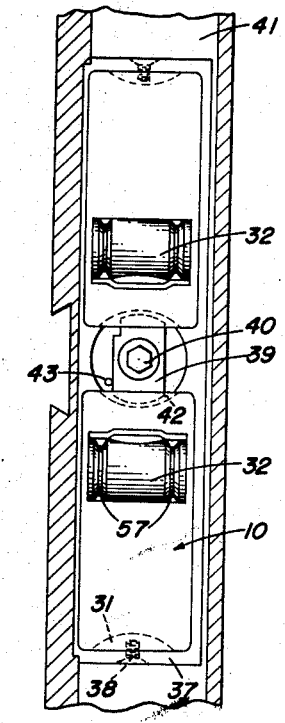
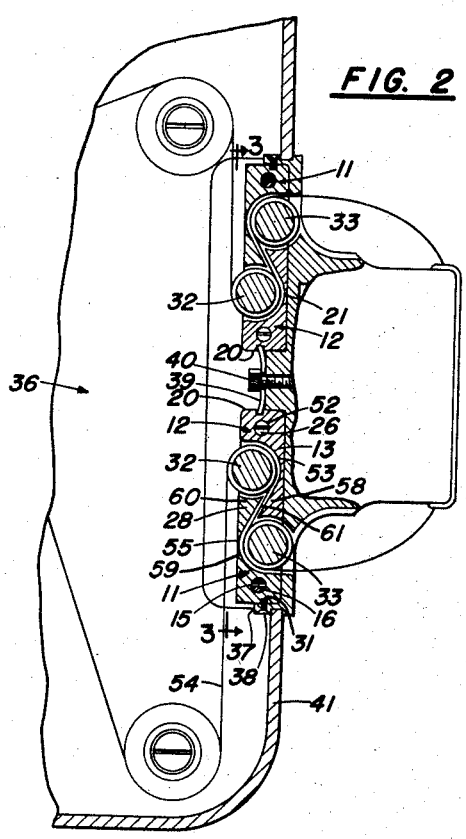
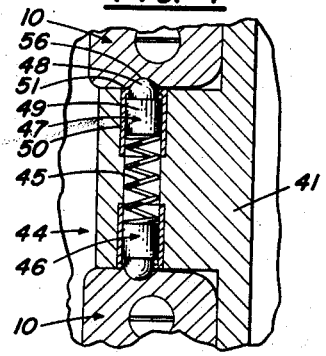
INVENTOR
GERALD J. BADGLEY
BY
ATTORNEYS United States Patent Office 2,844,991
Patented July 29, 1958

2,844,991

LIGHT TRAP

Gerald J. Badgley, District Heights, Md.

Application May 14, 1954, Serial No. 430,005

2 Claims. (Cl. 88—17)

(Granted under Title 35, U. S. Code (1952), sec. 266)

The invention described herein may be manufactured and used by or for the Government of the United States of America for governmental purposes without the payment of any royalties thereon or therefor.

This invention relates to an improved light trap construction for use with cameras or other types of equipment wherein a web is fed out of a light proof chamber without allowing light to enter the chamber. This application is a continuation-in-part of my copending application Serial No. 403,944, filed January 13, 1954, now Patent No. 2,807,177 which in turn is a continuation of my now abandoned application Serial No. 157,392, filed April 21, 1950.

The light trap, which is the subject of this invention, will be described in conjunction with its use in a photographic film magazine of a camera. However, it is to be understood that it may be used in any other applicable environment.

Prior art light trap constructions are characterized by a number of disadvantages. In the type of light traps which have velvet or other fabrics covering a slit through which a photographic film passes out of a light proof chamber, there is always the possibility of the generation of static electric charges on the film as the film rubs against the fabric when it passes through the light trap. The production of an electric charge on the film will cause particles of dirt and dust to be attracted to the film and adhere to it until the charge on the film is discharged. The dirt then separates from the film and deposits itself on the portions of the apparatus in the vicinity of the point of discharge of the electric charge. Since this discharge usually occurs when the film contacts the film gate and film handling mechanism of a camera, these portions of the camera become dirty and cease to function properly. Thus in this type of construction the film effectively acts as a conveyor belt to deposit particles of dirt at a given point in the apparatus.

On the other hand, there are metallic types of light traps in the prior art. The disadvantage of these is that they are complex in the sense that they are difficult to assemble and install in the environment in which they are to operate. Furthermore, special tools are needed for disassembling these prior art light traps for cleaning. It can readily be seen, therefore, that any particles of dirt which adhere to the film because of an electric charge produced on the film prior to its passage through the light trap will be deposited in the light traps because of the fact that the charge on the film is discharged upon contact with the metallic light trap. However, since these prior art light traps are difficult to disassemble and clean, the dirt which is deposited in the light traps will usually be allowed to accumulate therein. As a result of this accumulation of dirt the light traps will cease to function properly and film passing therethrough will be damaged.

The light trap of the instant invention overcomes the disadvantages of the prior art. This light trap is constructed in such a manner that it can be removed from a housing in which it is mounted, disassembled, cleaned, assembled, and then repositioned in its housing without the use of a large number of tools. The light trap is also constructed so that it can be taken from its mounting in a housing, turned end for end, and reinserted in the housing. Because of these features, the amount of skill and care required in removing, cleaning, and replacing the light traps is considerably reduced. The light trap itself consists of two body members and two rollers mounted in said body members. In the assembled condition the body members and the rollers provide a circuitous path through which a strip of film is adapted to pass, but through which light cannot pass. The body members and the rollers require no external fastening members for holding them in assembled condition. All the necessary fastening members are formed integrally with the rollers and the body members. The foregoing features contribute to the greater utility of the light trap per se both when it is made of metal and when it is not. Large accumulations of dirt within the light trap can therefore be prevented because the construction of the light trap lends itself to frequent and easy cleaning.

It is therefore one object of this invention to disclose a light trap which can be assembled and disassembled without the use of a large number of tools and without the use of special equipment.

It is another object of this invention to disclose a light trap which consists of relatively few parts.

It is still another object of this invention to disclose a light trap which can be inserted into a housing, in which it is adapted to be mounted, in a plurality of different positions and still be in the proper position for receiving a web which is to be threaded therethrough.

It is another object of this invention to disclose a light trap through which a web can be threaded by merely pushing the web through it.

Other objects and many of the attendant advantages of this invention will be readily appreciated as the same becomes better understood by reference to the following detailed description when considered in connection with the accompanying drawing wherein:

Fig. 1 is an exploded perspective view of the light trap; and

Fig. 2 is a partial elevational view in cross section of a plurality of light traps mounted on a chamber such as a film magazine; and Fig. 3 is a view taken on line 3—3 of Fig. 2; and Fig. 4 is a partial elevational view in cross section which shows a modified form of apparatus for holding the light traps in position on the chamber on which they are mounted.

Attention is now directed to Fig. 1 of the drawing wherein numeral 10 designates the light trap in exploded form. The light trap 10 consists of body members 11 and 12 which are substantially mirror images of each other when they are properly oriented. Body members 11 and 12 will be considered as mirror images of each other for the purpose of facilitating the description of the light trap. However, it can be seen that they can depart from being exact mirror images of each other in actual practice. These body members serve the purpose of journalling a plurality of rollers around which a web passes. Body member 12 consists of a block 13 to one side of which is suitably affixed a substantially rectangular side wall 14. The side of block 13 remote from that to which wall 14 is affixed has hole 15 bored therein. Block 13 has a curved surface 19, a film guide 58 tangentially joined to the curved surface 19, a substantially planar end wall 20, and a planar back surface 21, Figs. 1 and 2. Curved surface 19 forms a socket 53 to provide a channel for the film to ride in. This socket 53 also serves the function of providing a place for dirt to collect. Side wall 14 has pin 16 either formed integrally therewith or suitably attached thereto. Side wall 14 also has holes 17 and 18 bored therein. Pin 16 may be split at 22 for allowing the manipulating of the split portion of pin 16 for the purpose of increasing or decreasing its effective diameter by either spreading the split portions of pin 16 apart for the purpose of increasing or decreasing its effective diameter by either spreading the split portions of pin 16 apart or by closing them together, respectively.

When body member 11 is viewed as a mirror image of body member 12, the following elements of structure correspond. Side wall 23 corresponds to side wall 14. Holes 24 and 25 correspond to holes 18 and 17, respectively. Pin 26 and slot 27 correspond to pin 16 and slot 22, respectively. Block 28 corresponds to block 13, and surface 29 and end wall 30 of block 28 correspond to surface 21 and end wall 20 of block 13, respectively. It will be noted at this point that end wall 30 has a slot 31 formed therein. End wall 20 has a corresponding slot 42, Fig. 3. These slots serve the purpose of fastening the assembled light trap in a chamber in a manner to be described hereafter. A hole 52, Fig. 2, is formed in block 28 which corresponds to hole 15 in block 13. Block 28 has a curved surface 55 forming a socket 59, and a film guide 60, Fig. 2, which corresponds to curved surface 19, socket 53 and guide 58 of block 13. When the body members 11 and 12 are assembled guides 58 and 60 are spaced to define a film guiding slot 61 which joins the opposite surfaces of sockets 53 and 59 to form an S-shaped film guiding path around the roller 32, through the slot 61, and around the roller 33.

Rollers 32 and 33 are provided which are adapted to be journalled in the holes provided in side walls 14 and 23 of body members 12 and 11, respectively. More specifically, roller 32 has shaft 34 centrally located therein, which is adapted to be journalled in holes 24 and 17. Roller 33 has shaft 35 centrally located therein which is adapted to be journalled in bores 25 and 18 of body members 11 and 12, respectively. It is to be noted at this point that rollers 32 and 33 may either be formed integrally with shafts 34 and 35, respectively, which are then journalled in their respective bores or on the other hand the rollers can be rotatably mounted on their shafts which can be in turn fixedly inserted into their respective bores.

The light trap consisting of body members 11 and 12 and rollers 32 and 33 is adapted to be assembled by inserting pin 26 of body member 11 into hole 15 of body member 12; and by inserting pin 16 of body member 12 into hole 52 in body member 11. The shafts 34 and 35 of rollers 32 and 33, respectively, are aligned with the holes in the side walls 14 and 23, into which they are adapted to fit, and the body members 11 and 12 are slid together until pin 26 is firmly seated in hole 15 and pin 16 is firmly seated in hole 52, that is, until side wall 23 abuts block 13 and side wall 14 abuts block 28. It can be readily seen that the diameters of pins 16 and 26, which are variable in the manner described above, determine the ease with which the body members can be assembled and disassembled.

Reference is now made to Figs. 2 and 3 for a description of how the light traps are mounted on a film magazine 36, and how the combination of the light traps and the magazine operate. Although two light traps are shown mounted on magazine 36, the description will be confined to the lower one of the two light traps. A lip 37 is effectively formed in the wall 41 of magazine 36. This lip is adapted to receive a screw 38 which in turn protrudes through the lip 37. Slot 31 of body member 11 straddles the end of screw 38 which protrudes from lip 37, in the manner shown in Fig. 2. One end of the light trap is fastened in this manner. The other end of the light trap is held in position on the magazine by catch member 39 which is held on the wall of the magazine by bolt 40. Catch member 39 has a hole (not numbered) formed therein through which bolt 40 fits. The head of bolt 40 holds catch member 39 against side wall 41. When catch member 39 is in the position shown in Figs. 2 and 3, it engages the groove 42 in end wall 20, Fig. 3, which corresponds to groove 31 in end wall 30. It can thus be seen that both ends of the light trap are firmly held in the magazine 36 by the foregoing described structure.

In order to remove the light trap from the wall 41 of the magazine the following procedure is followed: Bolt 40 is loosened and catch member 39 is rotated as far as it will go in a counter-clockwise direction, as viewed in Fig. 3, about the axis of bolt 40 until its side wall abuts pin 43, Fig. 3, which is mounted on the magazine wall 41. Catch member 39, in this position, will therefore no longer engage recess 42 in the end wall of the light trap. The entire light trap can now be pivoted in a counter-clockwise direction, as view in Fig. 2, about screw 38, which is straddled by slot 31, and in this manner removed from the magazine 36. In order to insert the light trap into the magazine, a series of steps which are reverse to that described above can be followed. That is, the lower right hand corner of the lower light trap in Fig. 2 is first inserted into the recess into which the light trap is adapted to fit so that slot 31 straddles the end of screw 38. The light trap is then pivoted, in a clockwise direction, about its lower right hand corner until it is positioned as shown in Fig. 2. Catch member 39 is then rotated until it lies within the slot 42 of the light trap, and is then fastened in this position by tightening the bolt 40. It will be noted that catch member 39 is adapted to engage two light traps simultaneously.

An alternate arrangement for mounting the light traps in a magazine is shown in Fig. 4. In this modification, a double bullet latch 44 has been substituted for catch member 39 and bolt 40 of the modification shown in Figs. 2 and 3. The bullet latch is inserted into a hole drilled in the side wall 41 of the magazine. In the bullet latch 44, spring 45 biases latches 46 and 47 away from each other. The structure of latch 47 only will be described since latch 46 is similar in structure. Latch 47 consists of an actual latch portion 48 of reduced size, and an enlarged portion 49. Positioned within the bore in wall 41 by means of a press fit is a sleeve 50 which has an inwardly extending lip 51. It can be seen from the drawing that lip 51 coacts with the enlarged portion 49 of latch 47 to limit the outward movement of the latch 47. The means for retaining the other end of the light trap in position on a chamber is in all other respects similar to the modification shown in Figs. 2 and 3. In operation the bullet latch coacts with a suitable recess 56 for the purpose of retaining the light trap 10 in position on the magazine. In the device of Fig. 4, the removal of the light trap is effected by merely pulling the light trap 10 in the region of the bullet latch and thereby causing the light trap to pivot about a fastening such as 38, Fig. 2, to thereby become separated from the magazine. It will be noted that the bullet latch has been shown in Fig. 4 as a double latch because of the proximity of the light traps 10 to each other. However, it is to be understood that single latches could be used if the light traps were spaced farther apart.

When the light trap 10 has been removed from the magazine on which it has been mounted it can be taken apart for cleaning by merely pulling body members 11 and 12 in opposite directions. The disassembled light trap separates into four parts, as shown in Fig. 1. After the parts are cleaned, the light trap can be assembled by hand, without the use of any tools, and then again positioned within the magazine in the manner described above.

It can further be seen from Fig. 2 that the light trap can be positioned in the magazine in more than one way. For example, the upper light trap shown in this figure can be positioned with roller 33 above roller 32, as shown. On the other hand, the light trap can be taken out of the magazine and turned end for end so that the roller 32 is above roller 33. The light trap can then be replaced in the magazine in this position. It can be readily seen that because of the structure of the light trap that roller 32 will occupy the position that roller 33 previously occupied and vice versa. Because of this feature, the problem of placing the assembled light trap into the magazine is greatly simplified.

It will be further noted that the rollers 32 and 33 have grooves 57 formed therein, Figs. 1 and 3. The purpose of these grooves is to allow feed sprockets to be positioned in close proximity to the light traps in case this type of operation is desired. When the feed sprockets are positioned closely to the light traps, the teeth of the sprockets protrude into the above mentioned grooves.

The mode of threading a light trap will now be described, attention being directed to the lower light trap in Fig. 2. All that is necessary to thread the light trap is to insert the end of the film 54 between roller 32 and block 13 and push it into this opening. The film will follow the circuitous path defined by roller 32, socket 53, guide 58, slot 61, guide 60, socket 59, roller 33 and come out of the light trap between roller 33 and block 28.

Obviously many modifications and variations of the present invention are possible in the light of the above teachings. It is therefore to be understood that within the scope of the following claims the invention may be practiced otherwise than as specifically described.

Having thus described my invention I claim:

1. A removable light trap for a film magazine comprising a single pair of substantially identical body members, each of said body members consisting of a block portion and a side wall affixed to said block portion, each of said block portions having an arcuate face and a substantially planar face, means releasably holding said body members in light omitting relationship with said arcuate faces of said block portion in face to face relationship, thereby forming a single pair of sockets extending the full width of the block portion, a film entrance provided to one of said sockets, a film exit provided to the other of said sockets, a metallic roller rotatably mounted in each of said sockets, the axes of said sockets and said rollers being offset on oppoiste sides of a longitudinal central plane passing through the ends of said body members, a guide on each of said body members extending substantially tangentially from said socket towards said other socket and crossing a line joining the ecnters of said rollers to define a slot tangentially joining opposite surfaces of said sockets, whereby an S-shaped film guiding path is provided through said trap preventing leakage of light therethrough.

2. A removable light trap for a film magazine comprising a single pair of substantially identical body members, each of said body members consisting of a block portion and a side wall affixed to said block portion, each of said block portions having an arcuate face and a substantially planar face, means releasably holding said body members in light omitting relationship with said arcuate faces of said block portion in face to face relationship, thereby forming a single pair of sockets extending the full width of the block portion, a film entrance provided to one of said sockets, a film exit provided to the other of said sockets, a metallic roller rotatably mounted in each of said sockets, the axes of said sockets and said rollers being offset on opposite sides of a longitudinal central plane passing through the ends of said body members, said body members forming a slot joining the sockets together, said slot traversing a line passing through the axes of said sockets and rollers, whereby an S-shaped film guiding path is provided through said trap preventing leakage of light therethrough.

References Cited in the file of this patent

UNITED STATES PATENTS

| | | |
|---|---|---|
| 1,641,405 | Wittel | Sept. 6, 1927 |
| 1,863,066 | Owens | June 14, 1932 |
| 1,947,482 | Mihalyi | Feb. 20, 1934 |
| 2,007,468 | Fear | July 9, 1935 |
| 2,055,113 | Tondreau | Sept. 22, 1936 |
| 2,152,369 | Whittaker | Mar. 28, 1939 |
| 2,165,739 | Verkinderen | July 11, 1939 |
| 2,166,543 | Hillery-Collings | July 18, 1939 |